July 28, 1931.   F. GELSTHARP   1,815,972
APPARATUS FOR MAKING PLATE GLASS
Filed Jan. 17, 1928   2 Sheets-Sheet 2

INVENTOR
Frederick Gelstharp
by
James C. Bradley
atty

Patented July 28, 1931

1,815,972

UNITED STATES PATENT OFFICE

FREDERICK GELSTHARP, OF TARENTUM, PENNSYLVANIA, ASSIGNOR TO PITTSBURGH PLATE GLASS COMPANY, A CORPORATION OF PENNSYLVANIA

APPARATUS FOR MAKING PLATE GLASS

Application filed January 17, 1928. Serial No. 247,332.

Figure 1:
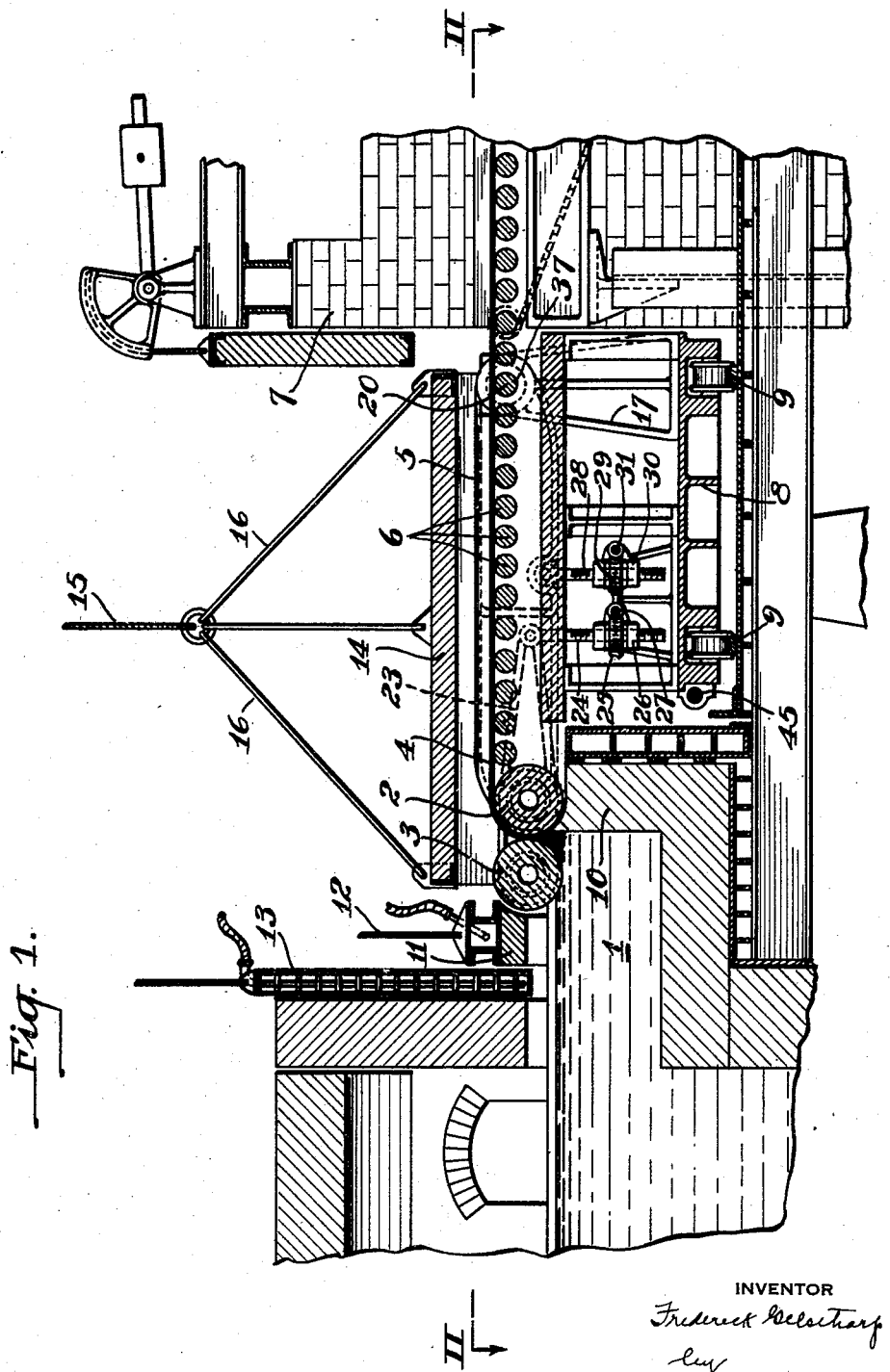
Figure 2:
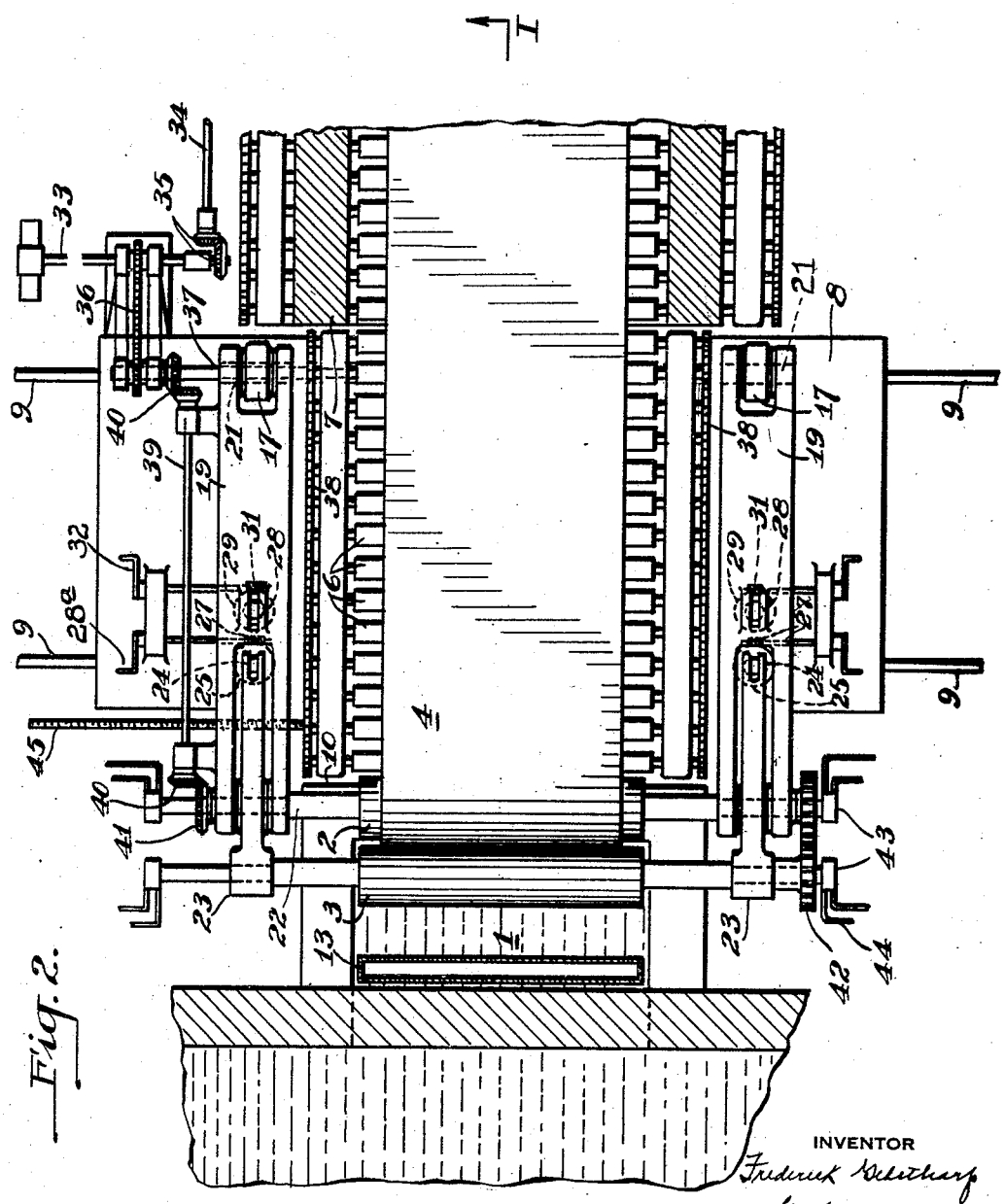

The invention relates to apparatus for producing a sheet or ribbon of glass continuously from a body of molten glass, and involves a further development of the construction shown in my Reissue Patent No. 16,856. The invention has for its primary objects, the provision of improved means for accomplishing the function above set forth; the provision of improved means for positioning the rolls with respect to the bath; and the provision of an arrangement in which the tendency to the formation of mechanical ream is reduced. One embodiment of the invention is illustrated in the accompanying drawings, wherein:

Figure 1 is a vertical section on the line I—I of Fig. 2. And Fig. 2 is a horizontal section on the line II—II of Fig. 1.

Referring to the drawings, 1 is a drawing tank or forehearth communicating with a melting tank, preferably of the regenerator type; 2 and 3 are driven water cooled rolls for continuously withdrawing the glass sheet 4 from the bath in the forehearth; 5 is a runway made up of the rolls 6, 6, 6, etc. for receiving the glass and conducting it into the roller leer 7; and 8 is a truck or carriage mounted upon the track 9 and supporting the sizing rolls 2 and 3 and the runway 5.

Adjacent the end wall 10 of the forehearth, such forehearth opens upwardly and in this opening is located the sizing roll 3, the remainder of the upper surface of the bath in the forehearth being closed by means of the cover plate 11, which is supported above for ready removal by means of the chains 12. A water cooled gate 13 is preferably employed for cutting off the supply of glass to the forehearth when it becomes necessary to make repairs on the forehearth or when for any reason it becomes desirable to cut off a communication between the drawing tank and the melting tank. A cover 14 of refractory material is preferably employed above the sizing rolls and runway in order to maintain the proper temperature in the space traversed by the glass sheet on its way to the leer, such cover being also supported for ready removal by means of the chains and rods 15 and 16.

The framework 17 of the truck carries a pair of arms 19, 19 pivoted to the framework 17 for swinging movement about the axis of rotation 20, such arms being pivoted upon suitable pivots 21, 21 (Fig. 2). These arms are provided with bearings which carry the rolls 6, 6, 6, etc. constituting the runway, and also carry the axle 22 of the sizing roll 2. The sizing roll 3 is carried by another pair of arms 23, 23 pivoted upon the axle 22 of the roll 2, so that the roll 3 may be adjusted vertically with respect to the axis of rotation of the roll 2 to adjust the degree of immersion of the roll 3 in the glass bath. The arms 23, 23 are extended to the rear, as indicated in Fig. 1, and are pivoted at their ends to the vertical threaded rods 24, 24. These rods extend through nuts carried by the worm wheels 25, 25 mounted in the brackets, 26, 26 carried by the frame of the truck. The worm wheels 25, 25 are rotated by means of worms carried upon the transverse shaft 27 and this transverse shaft 27 is provided at its end with a crank 28ª (Fig. 2). Provision is made in this way for swinging the roll 3 up and down to suit requirements. The arms 19, 19 which carry the runway rolls 6, 6, 6 and the sizing roll 2 are adjusted up and down by means of the threaded rods 28, 28 which extend through nuts in the worm wheels 29, 29. These worm wheels are carried in brackets 30, 30 and are adapted to be rotated by suitable worms on the shaft 31. This shaft extends laterally, as indicated in Fig. 2, and is provided at its end with a crank 32 for rotating it and thus raising and lowering the arms 19, 19. This adjusting device comes into play when it becomes necessary to remove the apparatus from the tank, at which time the shaft 31 is rotated so as to cause the raising of the arms 19, 19 carrying with them the runway and the sizing rolls, this movement being continued until the sizing rolls can clear the tank when the truck 8 is moved laterally. When the runway and rollers have been thus lifted, the truck is moved along the track 9 to one side of the tank.

The rolls 6, 6, 6 of the runway and the sizing rolls 2, 3 are driven from the shaft 33 shown in Fig. 2, such shaft being in turn driven from the leer drive shaft 34 through the intermediary of the bevel gears 35. The shaft 33 is provided with a sprocket having the sprocket chain 36 and such sprocket is splined on the shaft 33, so that the drive of the sprocket chain 36 may be continued regardless of the lateral position of the truck 8 upon its track. The sprocket chain 36 drives a shaft 37 which has as its axis of rotation the line 20 (Fig. 1) and this shaft 37 and the shafts of the rolls 6, 6, 6 are provided with sprockets around which pass the sprocket chains 38, 38, so that the rolls 6, 6, 6 are all driven from the shaft 37. The shaft 37 also drives the countershaft 39 through the intermediary of the bevel gears 40, and this countershaft 39 has at its end a beveled gear 40 in driving engagement with the bevel gear 41 on the shaft 22 of the roll 2. The rolls 2 and 3 have at their ends the intermeshing spur gears 42, the drive of the sizing rolls being in this manner provided for in any and all positions of adjustment. The shafts 37 and 39 and the driving mechanism, as indicated in Fig. 2, are supported by suitable sprockets carried by the framework of the truck 8, and the arm 19 so that all of these parts move with the truck as a unit, the only fixed part of the driving mechanism being the shaft 33 heretofore referred to, upon which the sprocket which drives the chain 36 is splined.

The arrangement of the roll 2 above the end wall 10 of the tank serves to reduce the amount of contact between the glass bath and such roll and reduces the tendency to form mechanical ream, which tendency is present where a chilled metal roll contacts with a body of molten glass. The rolls are water cooled by the use of the swivels 43 located at both ends thereof, to which are connected the supply pipes 44. When it is desired to start the operation, the parts are positioned, as indicated in Fig. 1, and the rotation of the sizing rolls is started, the glass sheet which is started in this manner being turned laterally over the roll 2, as it emerges, which turning operation can be performed by an operator with a bar. After the sheet has once been started, it continues in this path of movement. When it is desired to discontinue the operation, the crank 32 is operated to secure the upward movement of the threaded rods 28 and of the runway and sizing rolls, the sheet in process of formation being pulled apart below the sizing rolls after they have been lifted a short distance above the glass. This separation of the glass may also be facilitated by running the rolls at an increased rate of speed. For simplicity in illustration, no showing is included of the devices at the ends of the rolls, known as "guns", similar to the members 44 of my reissue patent heretofore referred to, but it will be understood that such devices and other auxiliary devices commonly used with rolling mechanism are to be employed as required.

What I claim is:

1. In combination, a glass tank containing a body of molten glass and open above the bath adjacent the end wall of the tank, a pair of horizontal driven sizing rolls arranged side by side with their center lines above the level of the glass and in substantially the same horizontal plane, one of such rolls being located in the opening above the bath, and having its periphery contacting with the bath, and the other of said rolls lying above said end wall of the tank, means for cooling the rolls so as to prevent the glass from sticking thereto, and a glass receiving bed or runway extending laterally at one side of the rolls for carrying away the glass which is formed between the rolls and delivered upward thereby.

2. In combination, a glass tank containing a body of molten glass and open above the bath adjacent the end wall of the tank a pair of horizontal driven sizing rolls arranged side by side with their center lines above the level of the glass, one of such rolls being located in the opening above the bath, and having its periphery contacting with the bath and the other of said rolls lying above said end wall of the tank, means for cooling the rolls so as to prevent the glass from sticking thereto a glass receiving bed or runway extending laterally at one side of the roll located above the end wall, means whereby the runway and rolls may be moved vertically as a unit and means whereby the roll engaging the glass bath may be swung vertically around the axis of rotation of the other roll to regulate its degree of immersion in the bath.

In testimony whereof, I have hereunto subscribed my name this 9th day of January, 1928.

FREDERICK GELSTHARP.